United States Patent

Nakamura et al.

[11] 3,793,907
[45] Feb. 26, 1974

[54] TORQUE TRANSMISSION DEVICE
[75] Inventors: Kenya Nakamura, Okazaki; Nobuo Fukuma, Toyota, both of Japan
[73] Assignee: Toyota Jidosha Kogyo Kabushiki Kaisha, Aichi-ken, Japan
[22] Filed: Apr. 12, 1972
[21] Appl. No.: 243,379

[30] Foreign Application Priority Data
Apr. 19, 1971 Japan.............................. 46/24478

[52] U.S. Cl.................... 74/798, 74/796, 74/198
[51] Int. Cl.... F16h 13/06, F16h 15/50, F16h 15/26
[58] Field of Search............. 74/798, 200, 198, 796

[56] References Cited
UNITED STATES PATENTS
3,229,538  1/1966  Schlotter.......................... 74/208 X
3,283,614  11/1966  Hewko................................ 74/798
3,618,423  11/1971  Chery.............................. 74/796 X
1,585,140  5/1926  Erban.................................. 74/798
2,586,725  2/1952  Schlottler......................... 74/796
3,203,278  8/1965  General............................ 74/796 X

*Primary Examiner*—Arthur T. McKeon
*Attorney, Agent, or Firm*—Toren, McGeady and Stanger

[57] ABSTRACT

In a torque transmission device, an input shaft and an output shaft are disposed in axial alignment within a casing and combine with a pair of inner rings concentrically secured on the input shaft, an outer ring encircling the inner rings, and transmitting elements disposed between and in contact with the inner rings and the outer ring, to form a planetary mechanism. The transmitting elements are operatively engaged with the output shaft. By applying hydraulic pressure to the outer ring the frictional contact between the transmitting elements and the outer ring and inner rings can be varied. Therefore, a large rotating force can be transmitted at a reduced speed by the utilization of friction transmission. The inner rings are of the split type and are located on the input shaft between a pair of supporting plates. Notches are formed in the inner rings and the supporting plates and contain balls which facilitate the transmission of power between the input shaft and the transmitting elements. A servomechanism, located within the casing outwardly of the outer rings, provides the variation in the application of hydraulic pressure to the outer ring in accordance with the variation in speed or torque between the input and output shafts.

9 Claims, 4 Drawing Figures

TORQUE TRANSMISSION DEVICE

BACKGROUND OF THE INVENTION

This invention relates to a torque transmission device and, more particularly, to an arrangement for transmitting large torque values at reduced speed by utilizing friction.

Friction transmission devices usually include transmitting elements which are brought into contact with each other through a lubricant film, thus transmitting the power to the transmitting elements at the output side at a reduced speed by means of a planetary mechanism or the like by utilizing the tractive force produced by the rotation of the transmitting elements at the input side.

However, in most of the friction transmission devices of the type mentioned above a constant allowable transmission power is determined for the friction transmission surfaces of transmitting elements. Consequently, if the moment of rotational inertia at the output side is large, metal contact with no intervening lubricant film occurs between the friction transmission surfaces in case when the speed variations are large, such as at starting, thus causing harmful slipping and melting the surfaces of the transmitting elements which shortens the usable life of the transmission device. Accordingly, to protect the transmission surfaces by eliminating such harmful slipping, it is necessary to limit the excessive torque required at the output side to a valve which is endurable for the friction transmission surface.

SUMMARY OF THE INVENTION

A primary object of the present invention is to eliminate the above-described drawbacks.

Further, another object of this invention is, in a friction transmission reduction gear consisting of an input shaft, an output shaft and a fixed shaft, to protect the friction transmission surfaces by limiting excessive torque of the output shaft by approximately controlling the torque endurable by the fixed shaft and by reducing the friction transmission torque to a value lower than the maximum allowable torque.

The various features of novelty which characterize the invention are pointed out with particularly in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
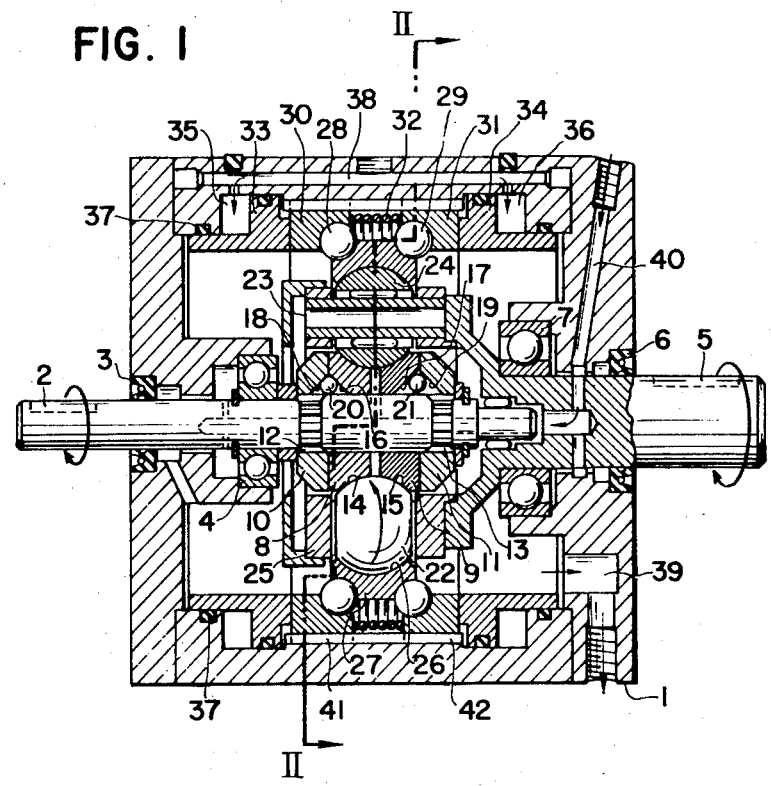
FIG. 1 is a longitudinal section of a torque transmission device.
Figure 2:
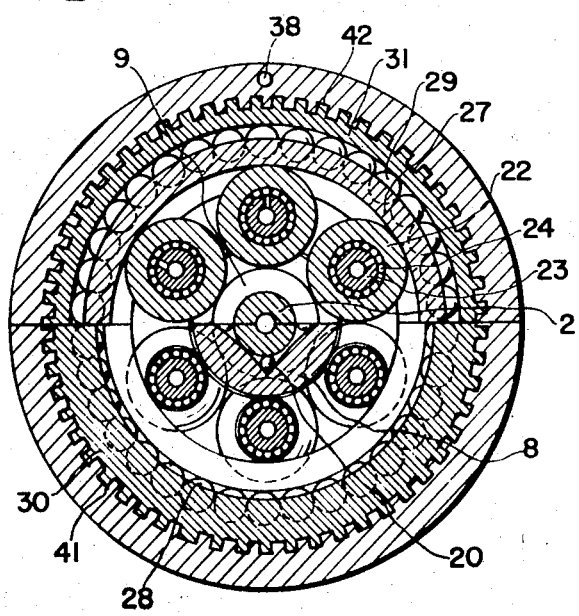
FIG. 2 is a cross-sectional view taken along II-II line of FIG. 1.

In FIGS. 1 and 2 a torque transmission device is illustrated, in accordance with the present invention, and includes a casing 1, a rotatable input shaft 2 extending into the casing on one side, and a rotatable output shaft 5 extending from the casing on the opoosite side. The input shaft 2 is sealed to the casing by a seal 3 and is rotatably supported by a bearing 4. The output shaft is in axial alignment with the input shaft and is sealed to the casing by a seal 6 and is rotatably supported by a bearing 7.

Split inner rings 8 and 9 are concentrically mounted on and integrally connected to the input shaft 2. Supporting plates 10 and 11 are integrally connected to the input shaft 2 with splines 12 and 13 and are located one on each of the outer sides of the inner rings 8 and 9. The inner rings 8 and 9 are axially spaced apart on the shaft and each has an outwardly facing friction transmission surface 14 and 15, respectively, on its radially outer periphery. The surfaces 14 and 15 each define a portion of a circular section. Notches 16 and 17 are located in angularly spaced relationship about the radially inner periphery of the rings 8 and 9 along the edge adjoining the adjacent support plate. In addition, the radially inner edges of the support plates 10 and 11 are provided with similar notches 18 and 19 positioned opposite the notches 16 and 17 in the inner rings 8 and 9. Inserted into the space defined by the surfaces of a pair of opposing notches 16 and 18 is a ball 20 of appropriate weight and a similar ball 21 is inserted into the space defined by the oppositely arranged other pairs of notches 17 and 19.

Disposed in a circle circumscribed about the outer periphery of the inner rings 8 and 9 are six transmitting elements 22 each in contact with the concave friction transmission surfaces 14 and 15. The transmitting elements 22 have convex surfaces conforming to the corresponding concave friction transmission surfaces 14 and 15 of the inner rings. A plurality of shafts 23 are arranged with their axes in parallel with the axis of the input and output shafts and each shaft 23 extends through one of the transmitting elements 22 and needle bearings 24 are positioned between the shafts and the transmitting elements rotatably support the transmitting elements. The shafts are held by retainers 25 so that they are secured in position relative to one another. Further, an outer ring 27, is concentrically disposed about the outer periphery of the transmitting elements and the inner surface of the outer ring 27 has a concave friction transmission surface 26 defining a portion of a circular section and disposed in contact with the convex surfaces of the transmitting elements 22. Thus, considering the input side of the device including the input shaft 2, the split inner rings 8, 9, the supporting plates 10, 11, the balls 20, 21 and the transmitting elements 22, when the input shaft is placed into rotation and its rotating speed is increased, due to the centrifugal force generated, the balls 20, 21 push against the surfaces in the notches 16–18, 17–19, and apply a preload to the transmitting elements 22 from the inner rings 8, 9. When the inner rings 8, 9 start to rotate while they are pulled by the transmitting elements 22, the notches 16–18, 17–19, are relatively deviated, thus pushing the balls 20 and 21 and applying a preload. Moreover, a preload is also applied when there is a significant variation in the rotating speed of the input shaft 2 and the output shaft 5 starts to follow the speed variation. A planetary mechanism is formed by the combination of the input shaft 2, the output shaft 5, the split inner rings 8,9, the transmitting elements 22 and the outer ring 27. Thus, power at a certain reduction ratio is transmitted to the output shaft 5 from the inner rings 8 and 9 which rotate together with the input shaft 2 through the transmitting elements 22 effecting a planetary rotation along the outer ring 27. In contact with the radially outer edge of the sides of the outer ring 27 are a pair of rings of balls 28,29 which seat within concave surfaces in the outer ring and in oppositely disposed concave surfaces in a pair of axially spaced retaining rings 30, 31. Each of the retaining rings is located on an opposite side of the outer ring 27 and the retaining rings are secured to the casing 1 by means of splines 41 and 42 so that they can slide in the axial direction. Further, a spring 32 is disposed radially outwardly from the outer surface of the outer ring and extends between the facing surfaces of the retaining rings 30, 31. On the sides of the retaining rings 30, 31 facing outwardly away from the outer ring 27 are pistons 33 and 34 which are slidably displaceable in the axial direction of the shafts. Each of the pistons 33, 34 has a hydraulic servo chamber 35,36 associated with it and O-rings 37 provide a seal between the pistons 33, 34 and the adjacent surface of the casing 1. A hydraulic pressure supply oil passage 38 is located in the casing 1 and extends between and in communication with the hydraulic servo chambers 35, 36. A a result, the outer ring, the balls 28, 29 and the retaining rings 30, 31 form an arrangement similar to a double-row angular contact ball bearing. A preload is applied to the balls 28, 29 based on the magnitude of the hydraulic pressure within the servo chambers 35, 36. The hydraulic pressure is transmitted through the pistons 33, 34 to the retaining rings 30, 31. In addition, an oil passage 39 is provided in the casing for discharging oil from its interior and an oil passage 40 is located in the casing for supplying lubricating oil to the output shaft 5 and the input shaft 2.

The following is a description of the operation of the device described above.

When the input shaft 2 is placed in rotation, its rotational action is transmitted from the inner rings 8,9 to the transmitting elements 22 which effect a planetary rotation along the inner surface of the outer ring 27. The rotation of the transmitting elements is transmitted by the shafts 23 to the output shaft 5 at a certain reduction ratio. At this time, hydraulic pressure is supplied through the oil passage 38 into the hydraulic servo chambers 35, 36 based on the variations in the speed or load torque between the input shaft 2 and the output shaft 5. Under normal conditions, a high hydraulic pressure is supplied within the servo chambers. Consequently, the pistons 33, 34 strongly urge the retaining rings 30, 31 against the balls 28, 29 and keep the outer ring 27 in a fixed condition.

Figure 3:
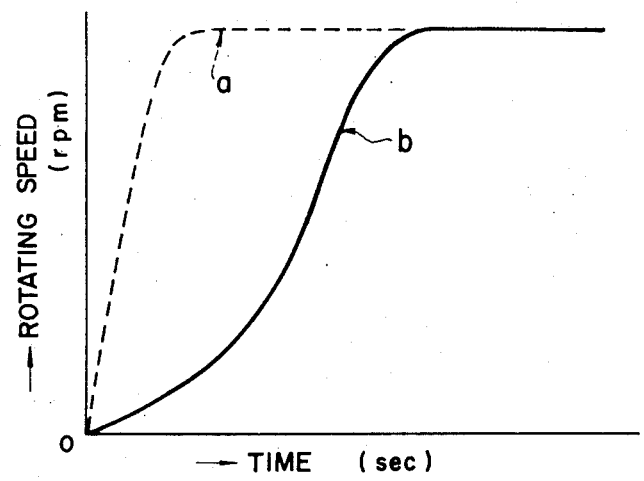
FIGS. 3 and 4 are diagrams illustrating the operation of the device.
Figure 4:
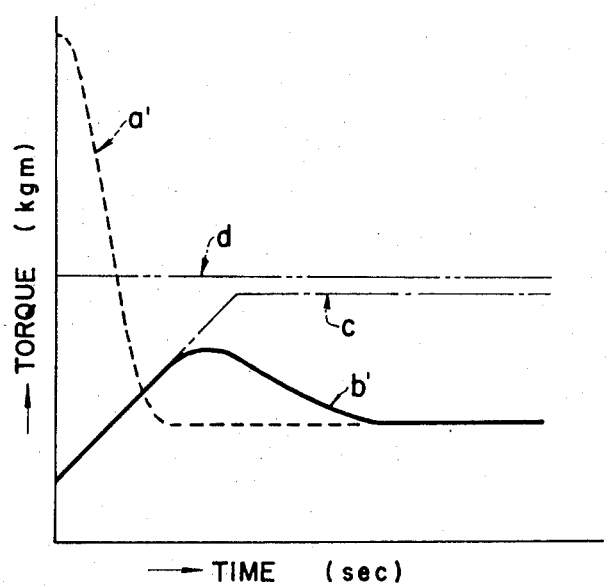

On the other hand, when a large variation in speed or load torque occurs, the hydraulic pressure within the servo chambers 35, 36 is decreased based on the magnitude of the variation, and, therefore, the extent of the preload applied to the balls also decreases. Thus, the outer ring 27 is driven by the transmitting elements 22 in the direction opposite to the direction of rotation of the input shaft 2. As a result, as shown in FIG. 3, the actual output rotational speed is slowly increased as indicated by the curve b with respect to the curve a which illustrates the theoretical output rotational speed when the outer ring 27 is fixed. Accordingly, sudden variations in rotational speed are relieved and low speed variation is maintained. The manner in which the torque is transmitted in such a case is shown in FIG. 4. In FIG. 4 the curve $a'$ illustrates the theoretical torque which must be transmitted by the output shaft 5 when the speed variations as shown by the curve a of FIG. 3 are developed. The curve c shows the reaction torque transmittable by the bearing constituted by the outer ring 27, the balls 28, 29, and the retaining rings 30, 31 (this reaction torque is converted to the output shaft torque). The curve d illustrates the maximum allowable torque of the output shaft 5 which the friction transmission surfaces 14, 15 and 26 can endure. The servo hydraulic paressure is set so that the curve c is always below the curve d. Thus, when sudden variations in speed or load torque develop, the hydraulic pressure is decreased, and, therefore, the rotational speed is transmitted as shown by the curve a and the radial preload is set as shown by the curve c. The actual torque which must be transmitted by the output shaft 5 is shown by the curve $b'$ and, as can be noted in FIG. 4, this curve initially slowly follows along the curve c and then breaks from the curve c and follows along the curve $a'$.

By means of the torque transmission device which utilizes friction transmission in accordance with the present invention, it is possible to limit the excessive torque required at the output side, when speed variations occur, to a value equal to or less than the value which the friction transmission surfaces can endure. Consequently, the device according to the present invention is quite advantageous in preventing melting, wear and the like such as is caused by harmful slipping. Further, it is also possible to change the torque transmitted linearly by the bearing during a certain period of time and then to maintain the torque at a constant value as shown by curve c.

While a specific embodiment of the invention has been shown and described in detail to illustrate the application of the inventve principles, it will be understood that the invention may be embodied otherwise without departing from such principles.

What is claimed is:

1. A torque transmission device utilizing friction in the transmission of the torque, comprising a casing, a rotatable input shaft extending into one side of said casing, a rotatable output shaft in axial alignment with said input shaft within said casing and extending outwardly from the opposite side of said casing from the side to which said input shaft extends, axially spaced split inner rings concentrically mounted on said input shaft within said casing, a plurality of transmitting elements each arranged in surface contact with said inner rings and disposed in a circle circumscribing said inner rings, first means for effecting a preload between said input shaft and said transmitting elements, an outer ring spaced radially outwardly from said inner rings and concentrically disposed about and in surface contact with said transmitting elements, second means separate from said first means for effecting a preload on said outer ring for retaining said outer ring in a fixed condition relative to said transmitting elements under normal conditions and for permitting said outer ring to be driven by said transmitting elements in the direction of rotation opposite to the direction of rotation of said input shaft when a large variation in speed or torque occurs, means for transmitting rotation from said transmitting elements to said output shaft by interconnecting said transmitting elements and said output shaft, and said second means for effecting a preload on said outer ring includes means for supplying variable hydraulic pressure for controlling the torque transmitted between said transmitting elements and said output shaft in accordance with variations in speed between said input and output shafts.

2. A torque transmission device, as set forth in claim 1, wherein said first means for effecting a preload between said input shaft and said transmitting elements comprises a pair of supporting plates spaced apart axially on said input shaft and each arranged in contact with a different one of said inner rings with said inner rings spaced between said plates, notches formed in the faces of said plates directed toward said inner rings and similarly shaped notches formed in the faces of each of said inner rings directed toward the adjacent said plate, said notches in said plates and inner rings arranged to align opposite one another in pairs, and a ball located within each pair of said notches for transmitting the preload between said inner rings and said plates.

3. A torque transmission device, as set forth in claim 2, wherein splines are formed on said input shaft for securing said supporting plates thereon.

4. A torque transmission device, as set forth in claim 10, wherein said outer ring having shoulders spaced axially apart and formed on the radially outer edges thereof, said second means for effecting a preload on said outer ring comprises two circles of balls each extending around a different one of said shoulders on said outer ring with said balls therein contact with said shoulder, a pair of retaining rings spaced apart in the axial direction of said outer ring and each located on an opposite side of said outer ring and having the side thereof adjacent said outer disposed in contact with the adjacent said circle of balls, and said means for supplying hydraulic pressure is disposed in contact with said retaining rings for variably biasing said retaining rings against said balls and in turn biasing said balls against said shoulders of said outer ring.

5. A torque transmission device, as set forth in claim 4, wherein said shoulders in said outer ring have a concave shape for seating said balls with said shoulders positioned so that said outer ring is biased inwardly toward said transmission elements when said retaining rings are biased against said balls.

6. A torque transmission device, as set forth in claim 4, wherein a spring is positioned radially outwardly from said outer ring and between the adjacent faces of said rataining rings for biasing said rataining rings apart.

7. A torque transmission device, as set forth in claim 4, wherein said means for supplying hydraulic pressure is located within said casing and comprises a pair of hydraulic servo chambers each positioned adjacent one of said retaining rings and on the opposite side of its adjacent said retaining ring from said outer ring, each said hydraulic servo chamber including a piston in contact with the adjacent said retaining ring.

8. A torque transmission device, as set forth in claim 1, wherein said means for transmitting rotation from said transmitting elements to said output shaft comprises intermediate shafts each located within one of said transmitting elements and having its axis in parallel with the axis of said output shaft, bearing means disposed between each said transmitting element and its associated said intermediate shaft, and means interconnecting said intermediate shafts and said output shaft.

9. A torque transmission device, as set forth in claim 1, wherein each of said transmitting elements has an exterior surface defining a portion of the surface of a sphere so that oppositely disposed convex surfaces on each of said transmitting elements are disposed in contact with the surfaces of said inner rings and said outer ring.

* * * * *